United States Patent [19]

Frechou et al.

[11] 4,153,069

[45] May 8, 1979

[54] GATE VALVES

[75] Inventors: Georges Frechou; Pierre Carriere, both of Toulouse, France

[73] Assignee: Societe Nationale Industrielle Aerospatiale, Paris, France

[21] Appl. No.: 745,988

[22] Filed: Nov. 29, 1976

[30] Foreign Application Priority Data

Dec. 17, 1975 [FR] France ................... 75 38629

[51] Int. Cl.² .......................... F16K 3/02; F16K 3/30
[52] U.S. Cl. .................. 137/238; 137/599.1; 251/327
[58] Field of Search ........................ 137/237–241, 137/599.1; 251/327

[56] References Cited

FOREIGN PATENT DOCUMENTS 17124 of 1909 United Kingdom ............... 137/246.19

Primary Examiner—William R. Cline
Assistant Examiner—Richard Gerard

[57] ABSTRACT

This invention relates to structure for preventing icing in fluid valves such as gate valves, the gate of which is movable inside a chamber. Obstacles formed with orifices therein communicate with the chamber, intercept the flow of fluid through the valve and create a continuous circulation of fluid in the chamber thereby preventing any accumulation of water therein which is liable to freeze and cause the valve mechanism to seize up.

7 Claims, 7 Drawing Figures

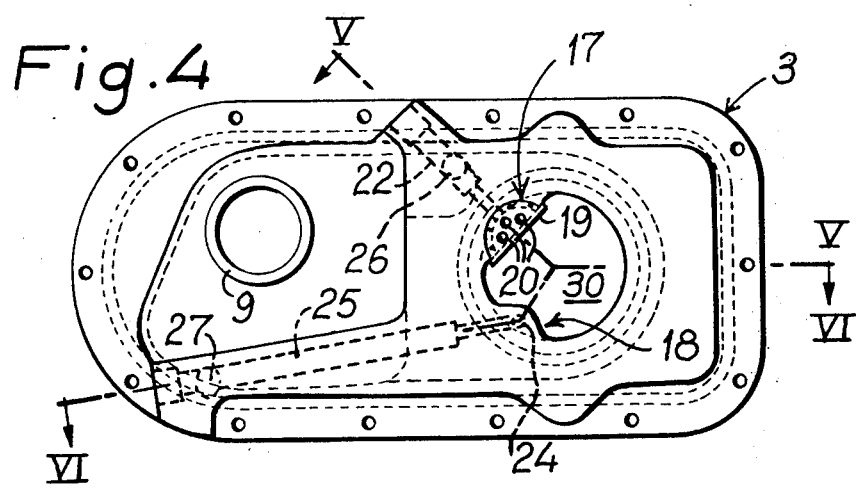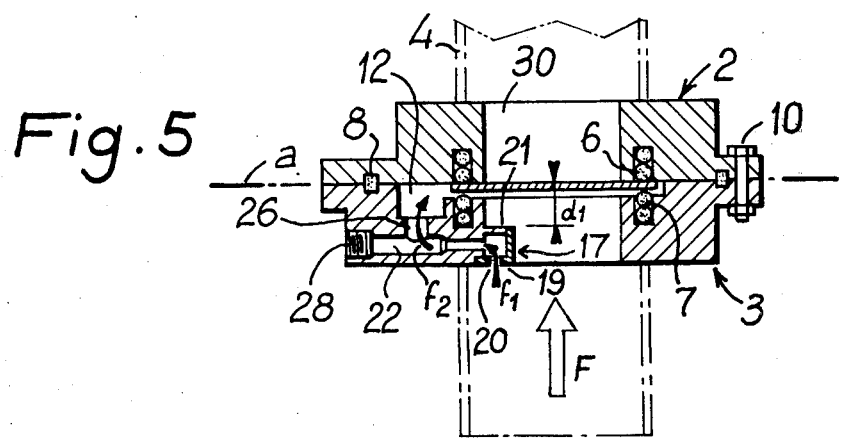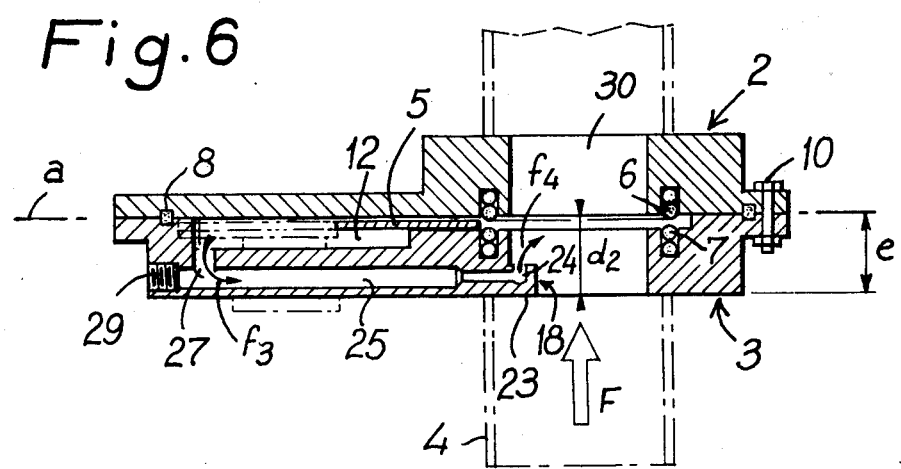

GATE VALVES

The present invention relates to fluid valves having obturating devices of the gating type and more particularly to structure for preventing seizure by icing in such valves in conduits or pipe through which flow fluids and most notably liquid fuels.

Prior art valves include an internal mechanism controlled by an actuating member which extends out onto the valve housing. In the case of gate-type valves the control mechanism is contained in a chamber, and the gate, which is movable perpendicularly to the pipe through which the fuel flows, either arrests or permits the flow of fluid, depending on its position. When the valve is operated, its gate slides between annular seals disposed inside the valve housing; these seals serve both as a seat for supporting the gate and provide a measure of leak-proofing to prevent the ingress of fuel into the chamber containing the control mechanism.

During movements of the gate, leaks may occur, due for example to wear in the elastic seals, and especially so when, in the closed position, the gate is urged against the downstream annular seal by the upstream pressure of the fluid, thereby facilitating the formation of a larger passageway into the chamber between the upstream seal and the gate.

Various solutions have been proposed with a view to preventing this drawback and ensuring perfect leak-tightness irrespective of the position of the gate. By way of example, French Pat. No. 1,251,449 describes a simple method of avoiding leaks into the chamber, which means consist basically in using air under pressure to inflate the annular seals on either side of the gate. However, experience has shown that, after a period of utilization of varying length, traces of fuel appear inside the gate chamber, which constitutes a calm zone where a certain quantity of fuel gradually accumulates. This accumulated fluid contains water in suspension that separates from the remainder of the fuel because of its greater density and deposits in what is usually the lowermost part of the chamber. Under certain climatic conditions, therefore, a negative outside temperature can cause this still water to freeze and thereby cause the control mechanism to seize up.

This invention has for its object the overcausing of this drawback by providing for a continual evacuation of any water which may accumulate in the mechanism chamber under duty conditions.

The invention accordingly relates to structure for causing part of the fluid passing through an open gate valve to continuously flow through the chamber thereof.

Thus, in contrast to prior art solutions, leaktightness is no longer sought for the valve chamber. In accordance with this invention, such chamber is placed in communication with the fluid, notably a liquid fuel, flowing through the valve whereby to cause a bypass flow through the chamber that prevents any unwanted accumulations therein, especially accumulations of water (liquid fuels usually contain a small proportion of water) liable to freeze at low temperatures and cause the valve mechanism to seize up.

The subject method of this invention can be carried into practice in the case of a gate valve by providing, inside the passageway therethrough, two obstacles placed on the same side of the gate but preferably on the upstream side thereof and formed with openings therein communicating with the interior of the chamber. These obstacles intercept the flow of fluid and create local differences in hydrodynamic pressure which cause a bypass flow of fluid through the chamber.

Each obstacle has at least one orifice formed therein. Since the obstacles and their orifices are located on the same side of the valve gate, namely upstream thereof, their presence cannot cause any upstream-to-downstream leaks in the valve when the same is in its closed position.

The obstacles are preferably disposed substantially at the same level as the plane of the gate and may be devised and arranged in different ways, as may also the passageways communicating the obstacle orifices with the valve chamber, in order to obtain optimum results in each specific application.

The description which follows with reference to the accompanying non-limitative exemplary drawings will give a clear understanding of how the invention can be carried into practice.

In the drawings:

FIG. 4 is a portrayal in the direction of arrow IV in FIG. 1;

FIG. 5 is a sectional view taken through the broken line V—V in FIG. 4; and

FIG. 6 is a sectional view taken through the broken line VI—VI in FIG. 4.

Figure 1:
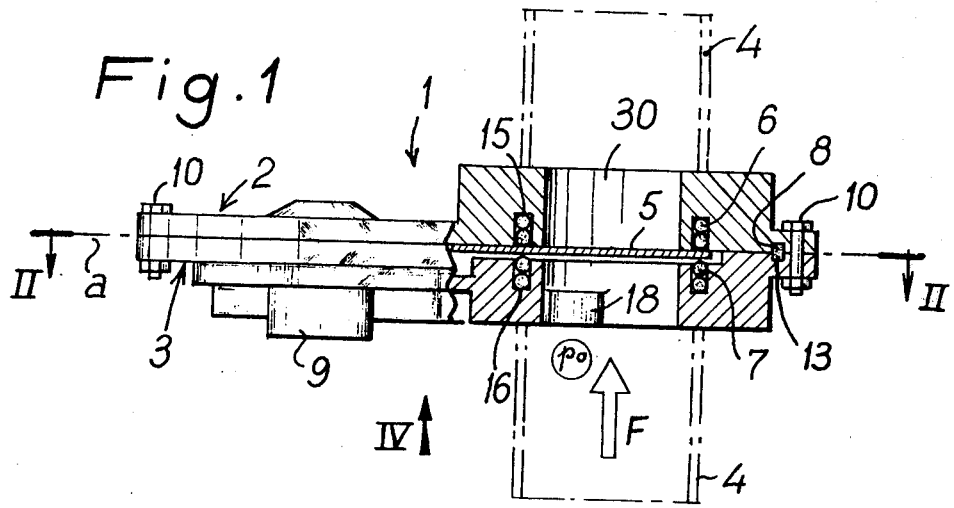
FIG. 1 shows a gate valve according to the invention in side elevation and in partial section through the line I—I in FIG. 2.
Figure 2:
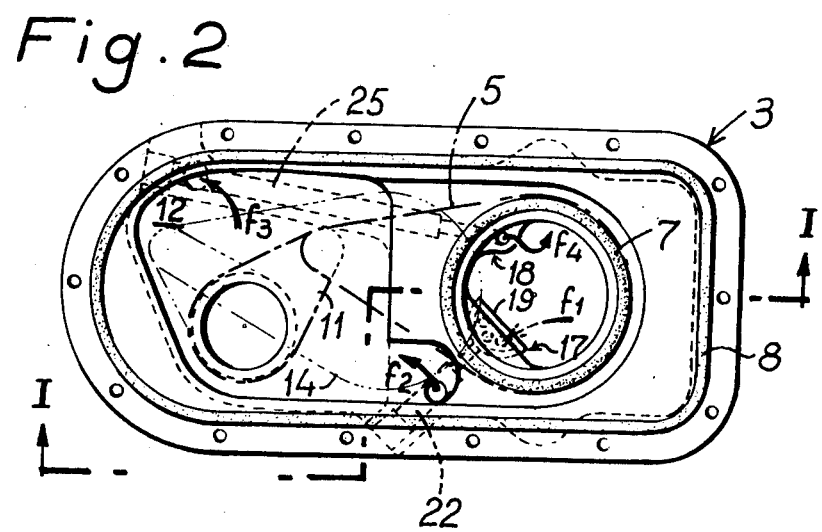
FIG. 2 shows the valve portion lying beneath the line II—II in FIG. 1.
Figure 3:
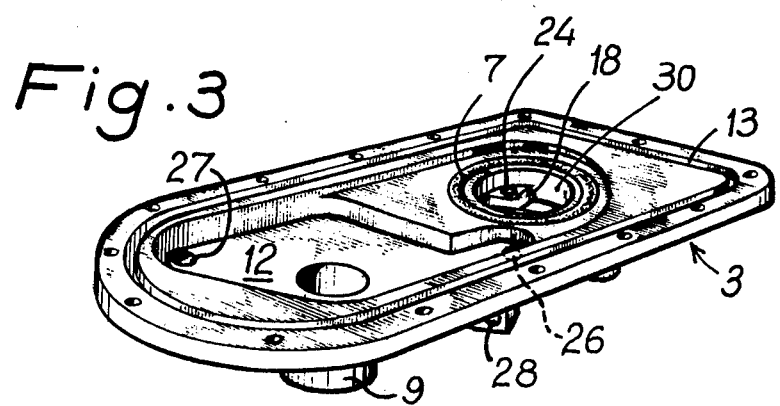
FIG. 3 shows the valve portion of FIG. 2 in perspective.

The gate valve 1 shown in FIG. 1 consists mainly of a two part housing, defining a through passage 30 to wit an upper part or plate 2 secured by bolts 10 to a lower plate 3. As shown in the drawing, the valve is connected (by means not shown) into a pipe or conduit 4 (represented in dash lines) or a fuel circuit. The direction of fuel flow is shown by the arrow F. Mounted in the housing is a closure or gate 5 which is movable in the housing between a position obturating the passage and a position opening the passage. For greater clarity in the drawing, the means for actuating the gate 5 are not shown although the bush 9 supports the gate. As shown in FIG. 2, lower plate 3 includes an internal chamber 12 inside which is movable the gate 5 actuated by an arm 11, the gate/arm assembly representing the control mechanism.

In order to ensure perfect fluidtightness at the joint plane a for plates 2 and 3, an elastic gasket 8 is provided inside a peripheral groove 13.

As FIGS. 1 and 2 show, gate 5 is capable of cutting off the fluid flow through the passageway 30 in valve 1. FIG. 2 further shows how movement of arm 11 permits obtainment of the configuration 14 (shown in dash lines) wherein the fuel passageway into pipe 4 is cleared through retraction of gate 5 to one side of chamber 12.

Elastic seals 6 and 7 are disposed on either side of gate 5 inside grooves 15 and 16 formed for the purpose in plates 2 and 3, concentrically with passageway 30. These seals, which are commonly used in gate valves, in this case merely provide flexible support for the gate 5, especially when, with the valve in the closed position, the upstream pressure $p_o$ urges gate 5 against the downstream annular seals 6.

Figure 4A:
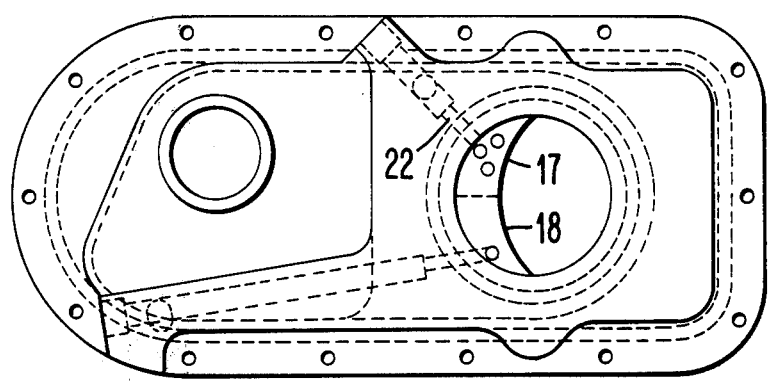
FIG. 4A is a view similar to that of FIG. 4 showing a continuation of the two parts of the valve obstacle.

FIG. 4 and 5 depict a first obstacle 17 positioned upstream of gate 5 and projecting into passageway 30. In the arrangement portrayed for exemplary purposes, obstacle 17 is formed by a removable grid 19 formed with holes 20 therein and a hollow wall member 21 rigidly united to plate 3, said member being disposed at a distance $d_1$ from joint plane a (which coincides substantially with the plane of gate 5). Grid 19 preferably abuts against wall member 21 and is made fast with plate 3 by any convenient means (merely suggested in FIGS. 4 and 5). The grid 19, the holes 20 herein are positioned facing the direction of flow F and constitute the orifices in obstacle 17, represents the fluid intake means whereas the member 21 allows deflecting the fluid in the direction of arrow $f_1$ towards valve chamber 12.

Accordingly, when fluid passes through the holes 20 in grid 19, the wall member 21 forms an arresting surface which modifies the general pressure field of the fluid and thus creates a pressure differential $\Delta p_1$ across the obstacle 17 that allows a certain amount of fuel to flow through a delivery conduit 22. As shown in FIG. 5, the fuel follows the path shown by arrows $f_1$ and $f_2$ and enters the valve chamber 12 through a communication port 26.

As shown in FIGS. 4 and 6, in order to permit discharging of the fluid from chamber 12, a discharge-means-forming second obstacle 18 is disposed upstream of gate 5 at a distance $d_2$ from joint plane a. This distance $d_2$, which is shown in the drawing to be equal to the thickness e of plate 3, can be either greater or less than said thickness.

As shown in FIG. 6, the second obstacle 18 comprises a fluid arresting portion 23 formed by a protrusion on the plate 3 containing chamber 12, and a discharge port 24 in the flow direction F through which the fluid by-passed through chamber 12 is delivered to conduit 4. In similar fashion to the first obstacle 17, this second obstacle produces a local pressure differential $\Delta p_2$ which, by co-acting with the one produced by the first obstacle, causes a continuous flow of fuel through valve chamber 12 throughout operation of the valve. In order to produce such flow, a second conduit 25, which communicates chamber 12 with port 24 through a communication port 27, allows the fluid to flow in the direction shown by arrows $f_3$ and $f_4$. Like the conduit 22, conduit 25 is formed through a wall of valve housing 1, to wit through plate 3.

Preferably, as shown in FIG. 4, the communication port 27 is located in the lowermost part of chamber 12 whereby, under certain utilization conditions, discharging of the water accumulated there is facilitated. As FIG. 5 and 6 furthermore show, removable plugs 28 and 29 close the ends of conduits 22 and 25 respectively. These plugs enable checks and possible cleaning of said conduits to be carried out rapidly.

In accordance with the invention, the two obstacles 17 and 18 are disposed substantially at the same level in the pipe, upstream of gate 5. This arrangement prevents any secondary leaks downstream of said pipe when valve 1 is closed.

The fuel flow rate through valve chamber 12 in operation depends mainly on the pressure differentials $\Delta p_1$ and $\Delta p_2$ produced by the obstacles 17 and 18 placed in the flow through the pipe. Thus, without departing from the scope of the invention, the specialist in the art can readily modify the valve of such flow rate by increasing, say, the number of delivery and discharge conduits 22 and 25 by providing in the valve passageway 30 a plurality of delivery of discharge porting means having one or more orifices each, or else by increasing the diameter of the conduits. Further, both the arrangement and the structure of said conduits may be modified, as may also the shape of the chamber, which shape depends primarily on the configuration of the control mechanism and on its operating mode.

The obstacles 17 and 18 may possibly be combined into a single obstacle having at least one orifice 20 and at least one orifice 24 in accordance with the description given precedingly.

The present invention provides a simple way of overcoming icing problems during operation of gate valves and finds application in all fuel circuits existing in environments where the temperature can cause water in suspension to freeze, such as on board aircraft flying at high altitudes.

What we claim is:

1. A valve for insertion in a conduit for carrying fluids such as a liquid fuel having portions of another liquid, having a higher freezing temperature, comprising a housing forming a chamber and defining a passage for said fluid, a closure member movable within said chamber between a position obturating said passage and a position removed therefrom, and a first duct disposed extending from said passage to said chamber for delivery of a portion of said fluid to said chamber and a second duct extending from said chamber to said passage for return of fluid therto, and at least one first obstacle means fixed within said housing and extending into said passage to intercept the flow of fluid, said first obstacle means comprising a wall having orifice on its upstream side for the introduction therein of a portion of said fluid in communication with said first duct, said wall creating a local hydrodynamic pressure difference within said passage permitting circulation of the portion of fluid through said chamber.

2. The valve according to claim 1, wherein the wall of said first obstacle means is integrally secured to said chamber and extends into said passage substantially normal to the flow of fluid and said first obstacle means includes a foraminous grid removably secured to the upstream side of said wall over said orifice.

3. The valve according to claim 1, including a second obstacle means extending into said passage, said second obstacle being connected to the downstream end of said second duct, and having an orifice in the direction of fluid flow.

4. A valve according to claim 3, in which both said first and second obstacle means are placed upstream of the closure member with respect to the direction of flow of the fluid.

5. A valve according to claim 3 in which both said first and second obstacle means are located substantially on the same level as the plane of the closure member.

6. A valve according to claim 3 in which the second obstacle means is an arresting-barrier-forming protrusion formed with an orifice therethrough.

7. A valve according to claim 3 in which said both first and second obstacle means are combined into a single structure having formed therein at least one inlet orifice and at least one discharge orifice for the fluid.

* * * * *